United States Patent
Reutlinger et al.

(10) Patent No.: US 6,908,095 B2
(45) Date of Patent: Jun. 21, 2005

(54) TOWING DEVICE

(75) Inventors: Peter Reutlinger, Bretten (DE);
Eberhard Palmer, Vaihingen (DE);
Andreas Piede, Illingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 45 days.

(21) Appl. No.: 10/617,357

(22) Filed: Jul. 11, 2003

(65) Prior Publication Data

US 2004/0075244 A1 Apr. 22, 2004

(30) Foreign Application Priority Data

Jul. 11, 2002 (DE) .......................................... 102 31 221

(51) Int. Cl.[7] .............................................. B60D 1/54
(52) U.S. Cl. .................................................. 280/491.3
(58) Field of Search .......................... 280/491.1, 491.3, 280/478.1, 479.1, 488

(56) References Cited

U.S. PATENT DOCUMENTS

| | | | | |
|---|---|---|---|---|
| 4,109,930 A | | 8/1978 | Pilhall ..................... | 280/491 B |
| 4,482,167 A | * | 11/1984 | Haugrud .................. | 280/491.3 |
| 5,853,186 A | * | 12/1998 | Gentner et al. .......... | 280/491.3 |
| 5,964,475 A | * | 10/1999 | Gentner et al. ........... | 280/420 |
| 6,409,201 B1 | * | 6/2002 | Riehle ...................... | 280/491.1 |
| 6,547,271 B2 | * | 4/2003 | Kleb et al. ............... | 280/491.3 |
| 2003/0006581 A1 | | 1/2003 | Moss et al. .............. | 280/416.1 |

FOREIGN PATENT DOCUMENTS

| | | |
|---|---|---|
| DE | 43 01 055 A1 | 7/1994 |
| DE | 19612959 | 10/1997 |
| DE | 198 58 978 A1 | 6/2000 |
| DE | 10004523 | 8/2001 |
| DE | 10023640 | 11/2001 |
| DE | 100 23 641 A1 | 11/2001 |
| EP | 1 153 770 A2 | 11/2001 |
| WO | WO 91/15374 A1 * | 10/1991 |
| WO | 01/32451 A1 | 5/2001 |

* cited by examiner

*Primary Examiner*—Kevin Hurley
(74) *Attorney, Agent, or Firm*—Crowell & Moring LLP

(57) ABSTRACT

A towing device has a ball neck equipped with a ball head that can be moved by a spindle adjusting element back and forth from an operative position into an inoperative position. The ball neck is arranged in a rotary block which is swivellably held in a carrier part. For supporting the ball neck in all possible loading directions, supporting surfaces, a torsion stop as well as a detent pawl are provided so that a movement of the coupling neck is avoided when forces act upon it, and a precise position is ensured in the operative position.

13 Claims, 5 Drawing Sheets

TOWING DEVICE

BACKGROUND OF THE INVENTION

This application claims the priority of German patent application No. 102 31 221.4, filed Jul. 11, 2002, the disclosure of which is expressly incorporated by reference herein.

The present invention relates to a towing device for motor vehicles, in which a ball neck is provided with a coupling ball and is moveable in an electrically controlled manner from an operative position to an inoperative position and back.

DE 100 04 523 A1 shows a trailer coupling device that is fastened to a vehicle and can be swivelled by a controllable motor into an operative and inoperative position. Fastening plates establish a connection of the trailer coupling device with the vehicle in order to transmit occurring forces into the vehicle chassis.

SUMMARY OF THE INVENTION

An object of the present invention is to provide a towing device which, in the case of forces acting upon the towing device in the operative position, ensures an optimal introduction of force with respect to all possible loading directions.

According to the invention, this object is achieved by a receiving element for the ball neck that is fastened to the vehicle body, and the ball neck is held to be swivelled and supported in an inserted rotary block and, in the operative position, the latter is held in possible loading directions (W, W1, X, X1, Z, Y) in a stationary manner in the receiving element.

Principal advantages achieved with the invention are that, in all possible loading directions, the towing device can carry out no movements from the operative position during the operation and is held in a positionally stable and force-transmitting manner at the vehicle body or at the bumper carrier. This is achieved essentially by a receiving element for the ball neck, which is fastened to the vehicle body and is held to be swivelled in an inserted rotary block which, in the operative position, is held by supports and similar supporting devices in possible loading directions stationarily positioned in the receiving element.

The supports of the towing device in the receiving element are essentially formed by supporting surfaces and hook-in devices. Particularly the receiving element consists of a carrier part which is connected on the end side in each case with carriers which are fastened to the vehicle body.

For the swivelling of the towing device from an operative position into an inoperative position and back, the present invention provides that the ball neck can be swivelled by an angularly bent joined arm in a rotary block held in the carrier part about a vertical axis. The rotary block itself with the ball neck can be swivelled about a horizontal axis. This swivelling capability of the rotary block in the carrier part for positioning the ball neck in the operative and inoperative position requires targeted supports in the receiving element as well as on parts of the device. Thus the towing device remains positionally stable in all possible directions during the towing operation.

For the swivelling of the ball neck, an angularly bent joined arm is fixedly connected with a swivelling lever which, on its one end, comprises a projecting detent which, in the operative position, projects into a slot of one leg in the carrier part and, at its other end, is connected with a spindle adjusting element.

For supporting the ball neck or the rotary block, the rotary block is arranged with its lateral surfaces between legs of the carrier part and is supported at the interior surfaces of the legs by stop disks of a swivel pin for the horizontal axis and is held in position by a face-side torsion stop. The torsion stop comprises a stationary nose which is connected with the carrier part, projects into a face-side recess of the rotary block and can support itself on surfaces of the recess or in the recess.

Thus, in the operative position, the ball neck can be supported in the case of a tension force, on the one side, in the rotary block and, on the other side, by a stop disk with respect to the interior surface of the leg on the carrier part. The nose of the torsion stop projects into the face-side recess of the rotary block and is supported on a surface. The interior surfaces of the legs in the carrier part are used in their entirety as supporting surfaces for the rotary block and can have a supporting effect with respect to the torsion stop and to the stop disks.

Also, in the case of a pressure force in the upward direction upon the ball neck, an optimal support of the rotary block is created. That is, in the operative position, the ball neck can be supported in the rotary block as well as by the detent of the swivelling lever, toward the carrier part. Furthermore, in the operative position of the ball neck, in the case of a supporting force in the downward direction, the rotary block is held in a supported manner by the face-side torsion stop on a supporting surface of the rotary block and/or by the hooking-in detent of the swivelling lever.

In the case of these loads upon the ball neck from below and above, it can be ensured by the corresponding supporting surfaces on the leg of the carrier part and by the corresponding supports on the rotary block that no relative movements of the rotary block impairing the operative position of the towing device can take place in the receiving element.

So that, also in the swivelled-in direction to the inoperative position, the towing device remains in a stable position where a correspondingly directed lateral force occurs upon the ball neck in the operative position, the present invention provides that the ball neck is supported by the swivelling lever and the spindle adjusting element disposed thereon, with the spindle-adjusting element having a self-locking thread. In addition, the spindle of the adjusting element can be driven in an automatically timed manner by a motor, and, in the case of lateral forces affecting the adjusting element, the spindle is continuously readjusted such that, in the operative position, the ball neck is held in a positionally stable manner.

As a result, it is advantageously achieved according to the present invention that, on one hand, the lateral forces can be absorbed by the detent of the swivelling lever locked into the slot of the leg and, on the other hand, by the spindle adjusting element, so that the position of the ball neck is stable in the operative position. A swinging-away is thereby avoided by the self-locking of the threaded spindle, and an occurring play is prevented by the automatic aftercycle of the motor.

When a lateral force occurs against the swivelling-in direction of the ball neck into the inoperative position, the ball neck can be supported, by the swivelling lever on the face-side torsion stop arranged in the recess, on a surface of the stop.

BRIEF DESCRIPTION OF THE DRAWINGS

Other objects, advantages and novel features of the present invention will become apparent from the following

DETAILED DESCRIPTION OF THE DRAWINGS

Figure 2:
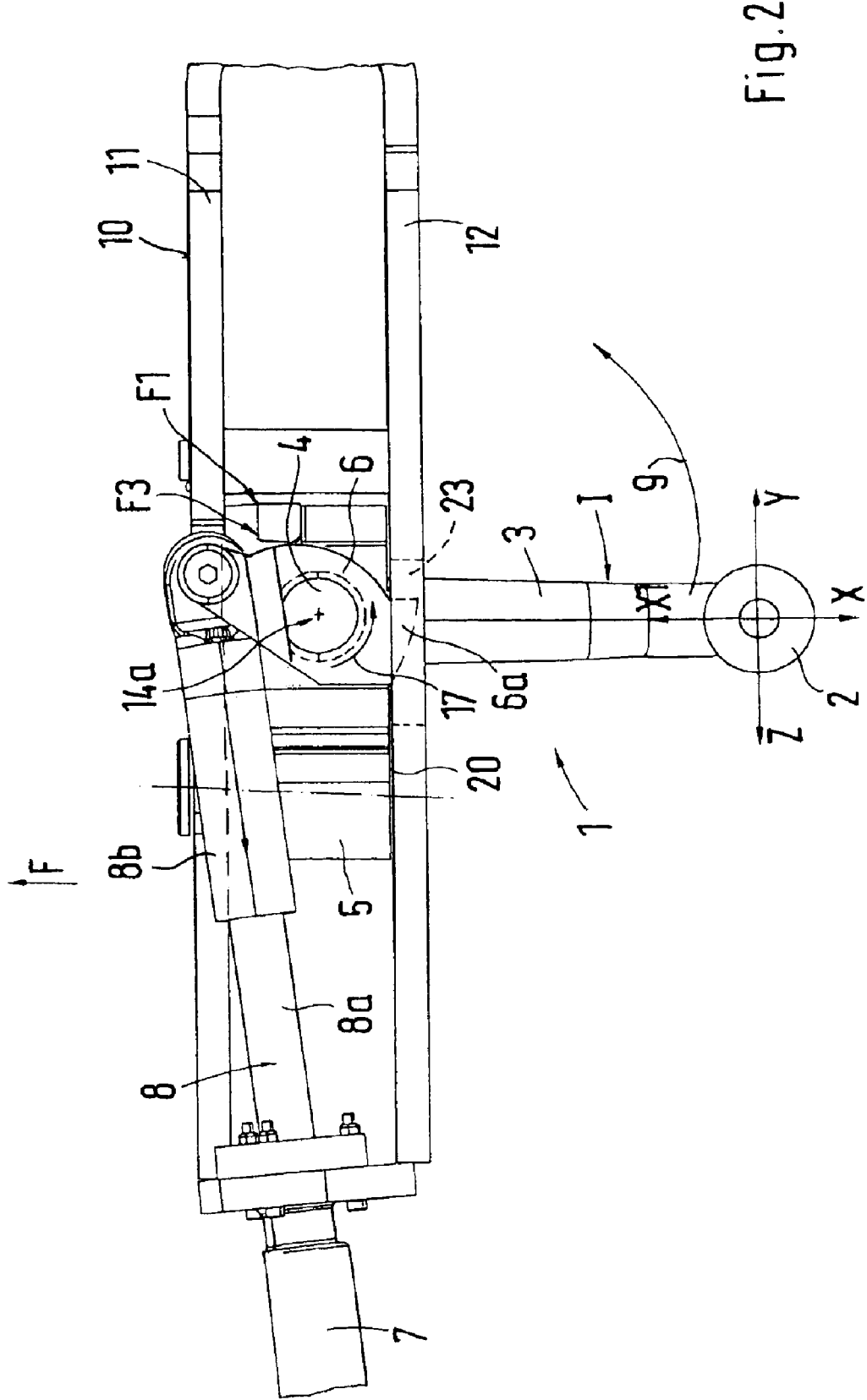
FIG. 2 is a top view of the towing device of FIG. 1 with a spindle adjusting element, a rotary block and a ball neck arranged in the receiving element.

A towing device designated generally by numeral 1 comprises essentially a ball neck 3 equipped with a coupling ball 2. The ball neck 3 is held by an angularly bent joined arm 4 (FIG. 4) in a rotary block 5 and, by a fixedly connected swivelling arm 6 with a spindle adjusting element 8 (FIG. 2) driven by a motor 7, can be moved from an operative position I in the direction of the arrow 9 into an inoperative position and back.

The rotary block 5 is embedded in a receiving element 10 constructed as a carrier part and is arranged and held between two parallel legs 11, 12. The receiving element 10 can be configured as a profiled closed carrier part which has carriers 15, 16 adjoining on both sides so as to be connected to the vehicle body.

Figure 3:
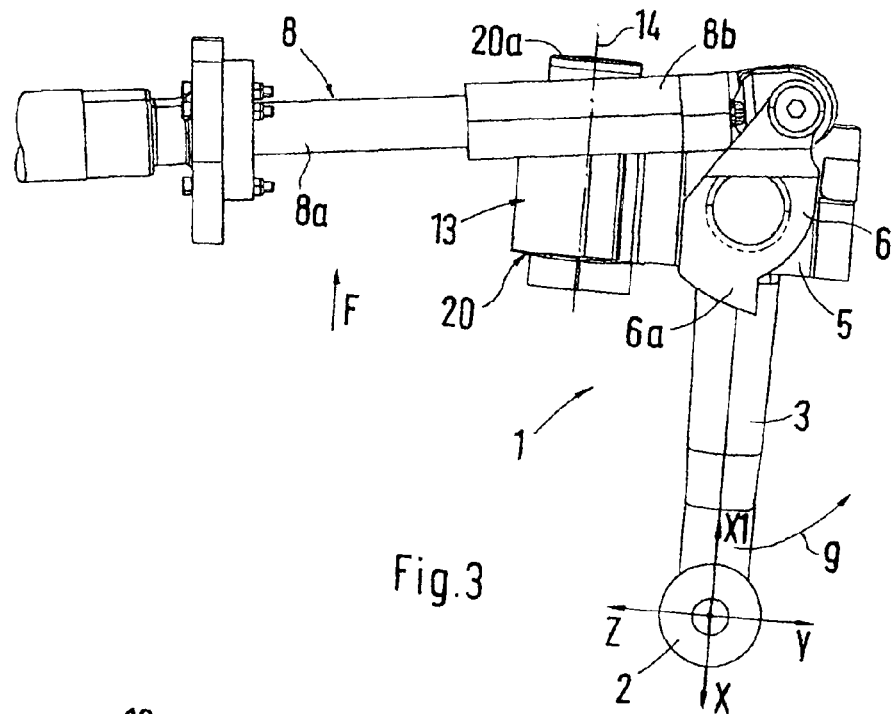
FIG. 3 is a top view of the ball neck of FIG. 2 with the connected spindle adjusting element.

The swivelling capability of the ball neck 3 into the inoperative and operative position takes place via the spindle adjusting element 8 in connection with the rotary block 5. For this purpose, a spindle rod 8a of the adjusting element 8 with a self-locking thread is rotated into a tapped bush 8b by the electrically driven motor 7. Thereby, the swivelling lever 6 fixedly connected with the joined arm 4 swivels in the direction of the arrow 17 (FIG. 2) while taking along the ball neck 3 about the vertical axis 14a. When an approximately straight-line position of the spindle adjusting element 8 and the ball neck 3 has been achieved, the rotary block 5, as a whole, swivels about the horizontal axis 14 (FIG. 3), which is formed by a rotating bush or a pin 13 which is held in the legs 11, 12 of the carrier part 10 and, for the swivelling of the rotary block 5, has one stop disk 20, 20a respectively on its ends. The stop disks 20, 20a rest against the interior side of the legs 11, 12.

For absorbing forces in all possible directions, the carrier part 10 is constructed as a profile or a box section so that the rotary block 5 is arranged in a form-locking manner between the legs 11, 12.

When tractive forces occur in the X direction during the operative position I of the towing device, the latter is guided via the ball neck 3 into the rotary block 5. The rotary block 5 is supported by the stop disk 20 on the pin 13 as well as by a face-side nose 21 of a torsion stop T (FIG. 4) which projects into a groove or recess 22 of the rotary block 5. The nose 21 is rigidly connected with the carrier part 10 or the legs 11, 12. A rotation of the overall system is avoided as a result of this support because of the disk 20 and a surface F1.

Figure 1:
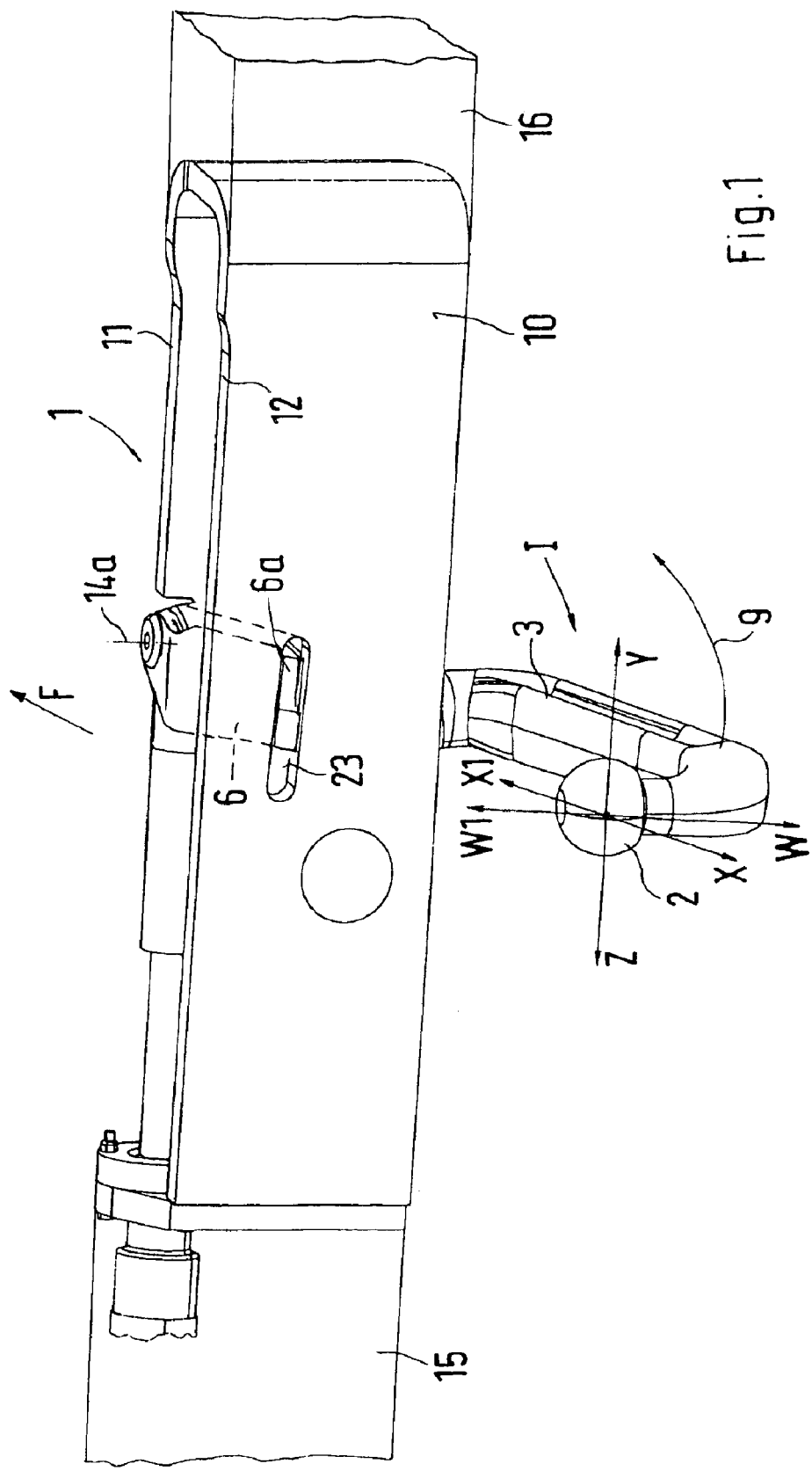
FIG. 1 is a perspective view from above of a towing device having a profiled receiving element and adjoining carriers as well as a coupling neck with a coupling ball showing the possible loading directions.

Pressure forces occurring in the direction X1 (FIG. 1) are guided by the ball neck 3 into the rotary block 5. The rotary block 5 is supported directly on the leg 11 of the carrier part 10 by the additional stop disk 20 as well as by a raised surface attachment 22b illustrated in detail in FIG. 4.

Figure 4:
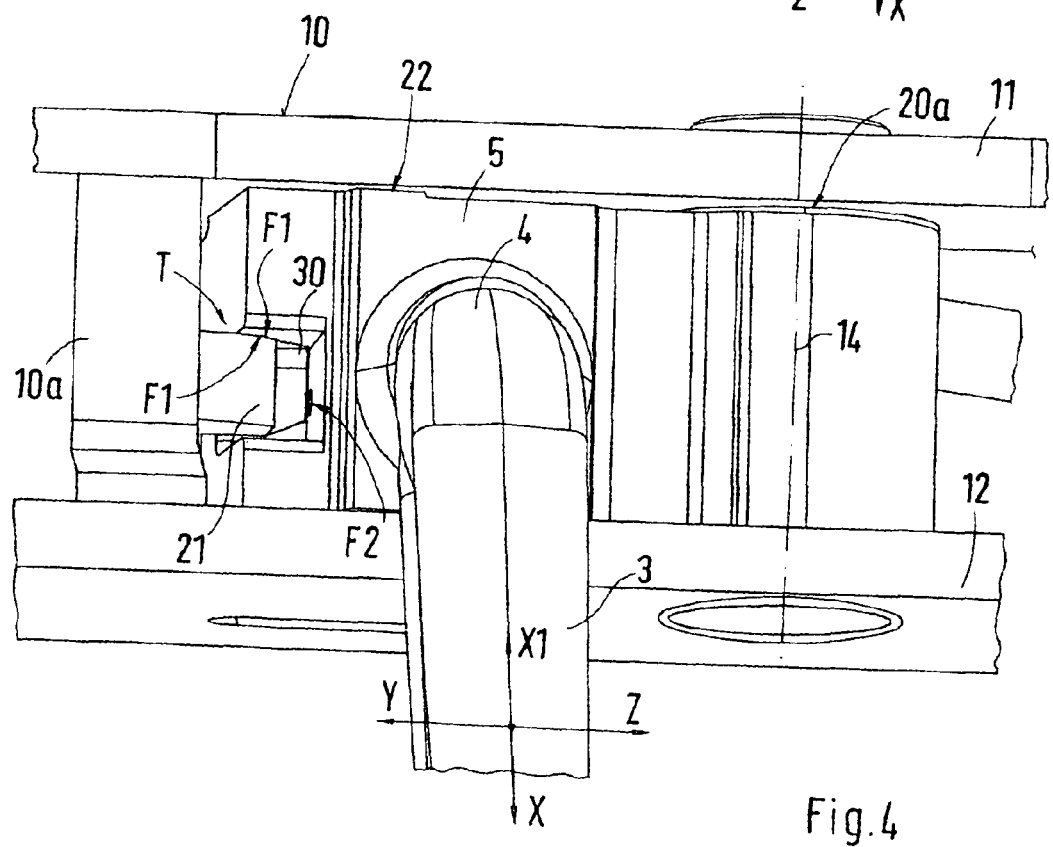
FIG. 4 is a bottom view of the ball neck of FIGS. 2 and 3 with the rotary block and the torsion stop and the supports or supporting surfaces.
Figure 5:
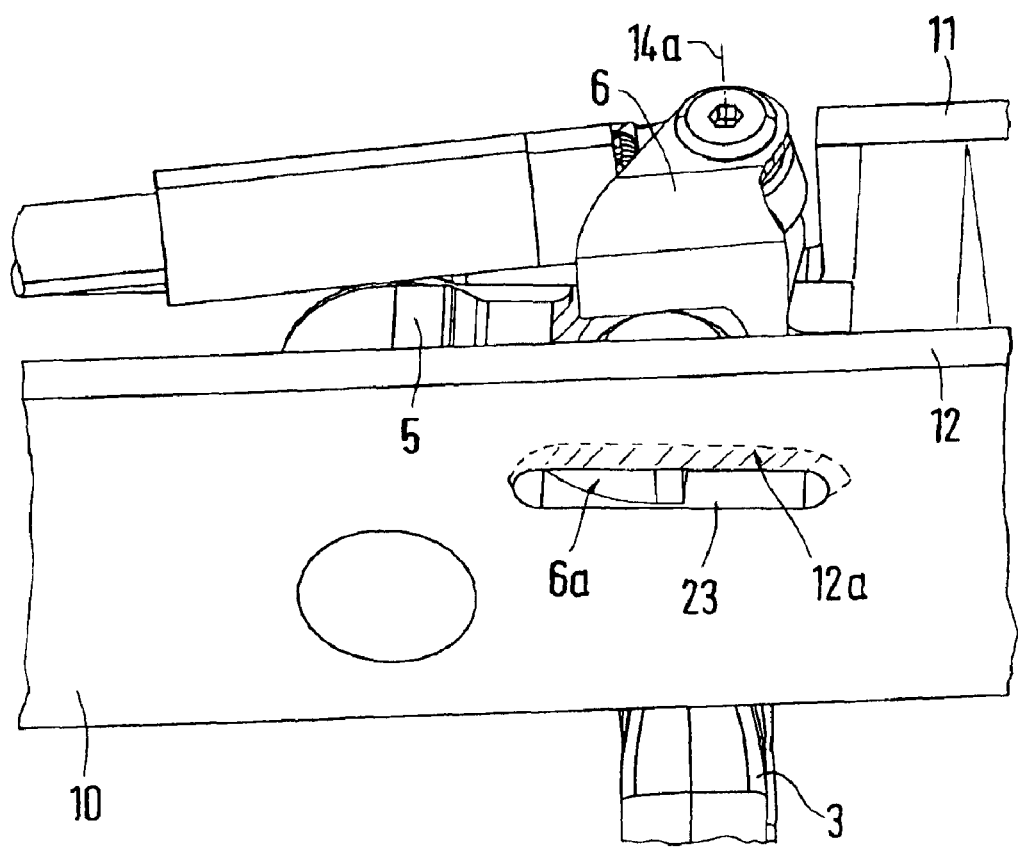
FIG. 5 shows a detent of a swivelling lever.
Figure 6:
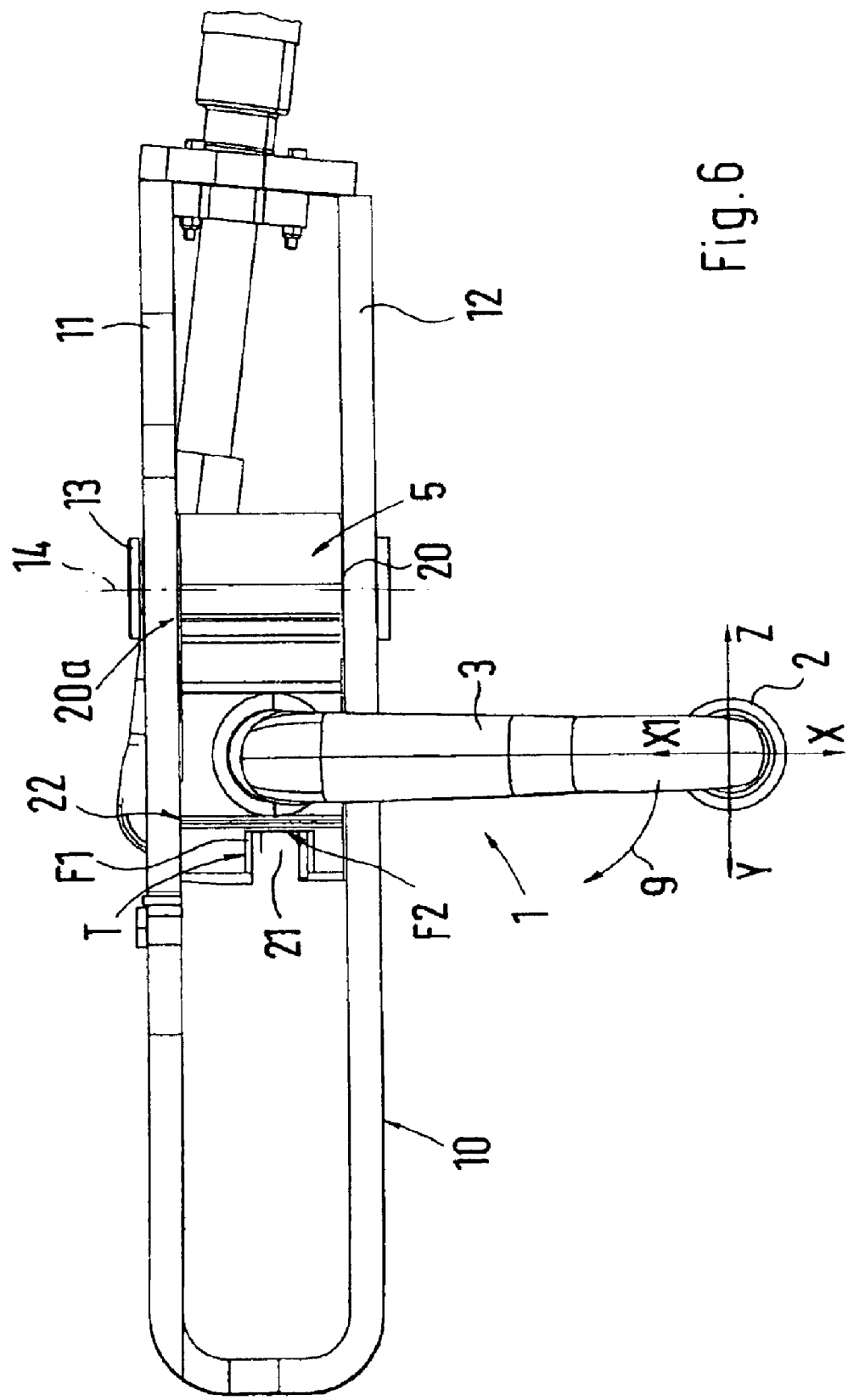
FIG. 6 is a bottom view of the receiving element with a rotary block and a spindle adjusting element as well as supports on the rotary block.

A supporting force downward in the W direction extends via the ball neck 3 into the rotary block 5. The nose 21 of the torsion stop T projecting on the face side into the groove 30 of the rotary block 5 guides the supporting force via a surface F1 of the recess 30 into the carrier part 10 as seen in FIG. 4.

A supporting force upward in the W1 direction extends by way of the ball neck 3 into the rotary block 5 and from the latter into the swivelling lever 6. The lever 6 comprises a detent 6a which, in the operative position I, is arranged in a slot 23 of the leg 12 of the carrier part 10 and is supported on the swivelling surface 12a.

A lateral force from the left, with respect to the driving direction F, in the counterclockwise direction Y extends, via ball neck 3, the swivelling lever 6 to the adjusting element 8. So that a swinging-away of the ball neck 3 is avoided, the threaded spindle 8 has a self-locking device. A nevertheless occurring play is prevented by an automatic aftercycle by the motor 7, so that, in the operative position I, the ball neck 3 can always take up a stable position.

A lateral force from the right, i.e., with respect to the driving direction F, in the direction Z, extends via the ball neck 3 into the swivelling lever 6 or onto the detent 6a and onto the nose 21 of the torsion stop T or on the supporting surface F2, and from the latter into the receiving element 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Towing device comprising a ball neck having a coupling ball and movable to and from an operative position and an inoperative position, a receiving element for the ball neck is fastenable to a vehicle body, and a rotary block rotationally holds and supports the ball neck therein, wherein the ball neck is arranged to be swivelled via an angularly bent joined arm in the rotary block operatively held in a carrier part of the receiving element about a vertical axis, such that the rotary block and the ball neck are arranged to be swivelled about a horizontal axis.

2. Towing device according to claim 1, wherein, on end sides of the carrier part, the carrier part is connected with carriers so as to be fastenable to the body of the vehicle.

3. Towing device according to claim 1, wherein the rotary block is arranged with lateral surfaces thereof between legs of the carrier part and is at least one of supported on interior surfaces of the legs by stop disks of a pin containing the horizontal axis, and held in position by at least one of a face-side torsion stop and a detent of a swivelling lever.

4. Towing device according to claim 3, wherein the torsion stop comprises a nose which is rigidly connected with the carrier part, projects into a face-side recess of the rotary block and is supported on surfaces of the recess.

5. Towing device according to claim 3, wherein, in the operative position, during a tractive force in a first direction, the ball neck is supported in the rotary block which is supported by the stop disk on an interior surface of one of the legs on the carrier part, the nose of the torsion stop projecting into a face-side recess of the rotary block and being situated opposite a supporting surface.

6. Towing device according to claim 5, wherein the torsion stop comprises a nose which is rigidly connected with the carrier part, projects into a face-side recess of the rotary block and is supported on surfaces of the recess.

7. Towing device according to claim 3, wherein the swivelling lever is fixedly connected with the joined arm of the ball neck and comprises a projecting detent at one end thereof, the detent, in the operative position, projecting into a slot of the one leg of the carrier part, and the swivelling lever, at another end thereof, being connected with a spindle adjusting element.

8. Towing device according to claim 3, wherein, in the operative position of the ball neck, during a pressure force in an upward direction, the ball neck is supportable in the rotary block and, via the detent of the swivelling lever, with respect to the carrier part.

9. Towing device according to claim 3, wherein, in the operative position of the ball neck, during a supporting force in a downward direction, the rotary block is supportably held by at least one of the face-side torsion stops on a supporting surface and the detent of the swivelling lever.

10. Towing device according to claim 7, wherein, during a lateral force in a particular direction, the ball neck is supportable via the swivelling lever and the spindle adjusting element disposed thereon, which spindle adjusting element has a self-locking thread.

11. Towing device according to claim 10, wherein the spindle of the adjusting element is arranged to be driven by a motor, and, with lateral forces in the particular direction acting upon the adjusting element, the spindle is configured to be automatically readjusted such that the ball neck is held in a secured position in the operative position.

12. Towing device according to claim 3, wherein, in the operative position, during a lateral force in a particular direction, the ball neck is supportable by the swivelling lever on the face-side torsion stop arranged in the recess on a surface of the stop.

13. Towing device according to claim 3, wherein, in the operative position, during a pressure force in a particular direction, the ball neck is supportable in the rotary block which is supported directly in the carrier part via a projecting surface and the stop disk.

* * * * *